United States Patent
Derbeko et al.

(10) Patent No.: US 9,940,460 B1
(45) Date of Patent: Apr. 10, 2018

(54) CLEANING MALWARE FROM BACKUP DATA

(71) Applicant: EMC Corporation, Hopkinton, MA (US)

(72) Inventors: Philip Derbeko, Modiin (IL); Assaf Natanzon, Tel Aviv (IL); Yaniv Harel, Yahud (IL); Harel Ram, Omer (IL); Yossef Saad, Gannel Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 89 days.

(21) Appl. No.: 14/975,445

(22) Filed: Dec. 18, 2015

(51) Int. Cl.
  *G06F 21/56* (2013.01)
  *G06F 11/14* (2006.01)

(52) U.S. Cl.
  CPC ........ *G06F 21/568* (2013.01); *G06F 11/1458* (2013.01)

(58) Field of Classification Search
  CPC .................................................. G06F 21/568
  See application file for complete search history.

(56) References Cited

U.S. PATENT DOCUMENTS

| | | | | |
|---|---|---|---|---|
| 8,407,795 B2* | 3/2013 | Palagummi | ........... | G06F 21/562 726/24 |
| 8,495,037 B1* | 7/2013 | Westenberg | ........ | G06F 11/1448 707/698 |
| 9,317,686 B1* | 4/2016 | Ye | ....................... | G06F 11/1461 |
| 2005/0232593 A1* | 10/2005 | Kanai | ................... | H04N 5/781 386/259 |
| 2006/0004535 A1* | 1/2006 | Gladfelter | ............ | G01D 18/002 702/122 |
| 2008/0195676 A1* | 8/2008 | Lyon | .................... | G06F 11/1469 |
| 2011/0289584 A1* | 11/2011 | Palagummi | ........... | G06F 21/562 726/24 |
| 2015/0067860 A1* | 3/2015 | Levow | .................. | H04L 63/145 726/24 |
| 2015/0172304 A1* | 6/2015 | Kleczynski | ......... | H04L 63/1416 726/23 |

OTHER PUBLICATIONS

Suo et al.; Security and privacy in mobile cloud computing; Published in: Wireless Communications and Mobile Computing Conference (IWCMC), 2013 9th International; Date of Conference: Jul. 1-5, 2013; IEEE Xplore (Year: 2013).*

Jiang et al.; Stealthy malware detection through vmm-based "out-of-the-box" semantic view reconstruction; Published in: Proceeding CCS '07 Proceedings of the 14th ACM conference on Computer and communications security; pp. 128-138; ACM Digital Library (Year: 2007).*

* cited by examiner

*Primary Examiner* — Bradley Holder

(74) *Attorney, Agent, or Firm* — Womble Bond Dickinson (US) LLP

(57) ABSTRACT

Embodiments described herein perform cleanup of backup images of a storage system by applying a record of I/O operations recorded while performing anti-malware operations on the storage system. The recording of the I/O operations can be replayed to resolve malware infections in the backup images, snapshots, or replicas of the storage system without requiring a restore-cleanup cycle for each backup image.

12 Claims, 8 Drawing Sheets

CLEANING MALWARE FROM BACKUP DATA

FIELD OF THE INVENTION

Embodiments described herein relate generally to data storage systems. More particularly, embodiments described herein relate to cleaning malware from backing up data.

BACKGROUND

Computer antivirus programs are commonly used to detect, clean, and remove computer viruses from infected objects such as data files. One form of detection typically used is scanning of objects resident on a hosting computer system's storage device(s). Objects are scanned for the presence of an embedded virus, and the scanning may be either signature-based or heuristic. After a virus has been detected in an object, responses typically involve cleaning or repairing the infected object (the object containing the virus), deleting the infected object, or quarantining the infected object to block further access.

In some instances, advanced cyber-attacks can infect target machines well before the attack is identified. In some instances, the duration of infection can extend for as long as a year. During this period the attackers perform internal reconnaissance, move latterly (infect additional machines), maintain presence, collect and possibly ex-filtrate data. During such an extended period of time, not only are different machines are infected but also backup images of the machines may be infected. For example, if malware installs itself in a master boot record (MBR) of a machine or in any specific binary, when the machine is backed up the backup images becomes infected. Accordingly, it may be difficulty to return to those images even if the malware was exterminated in the production machines.

BRIEF DESCRIPTION OF THE DRAWINGS

Embodiments described herein are illustrated by way of example and not limitation in the figures of the accompanying drawings in which like references indicate similar elements.

DETAILED DESCRIPTION

Figure 1:
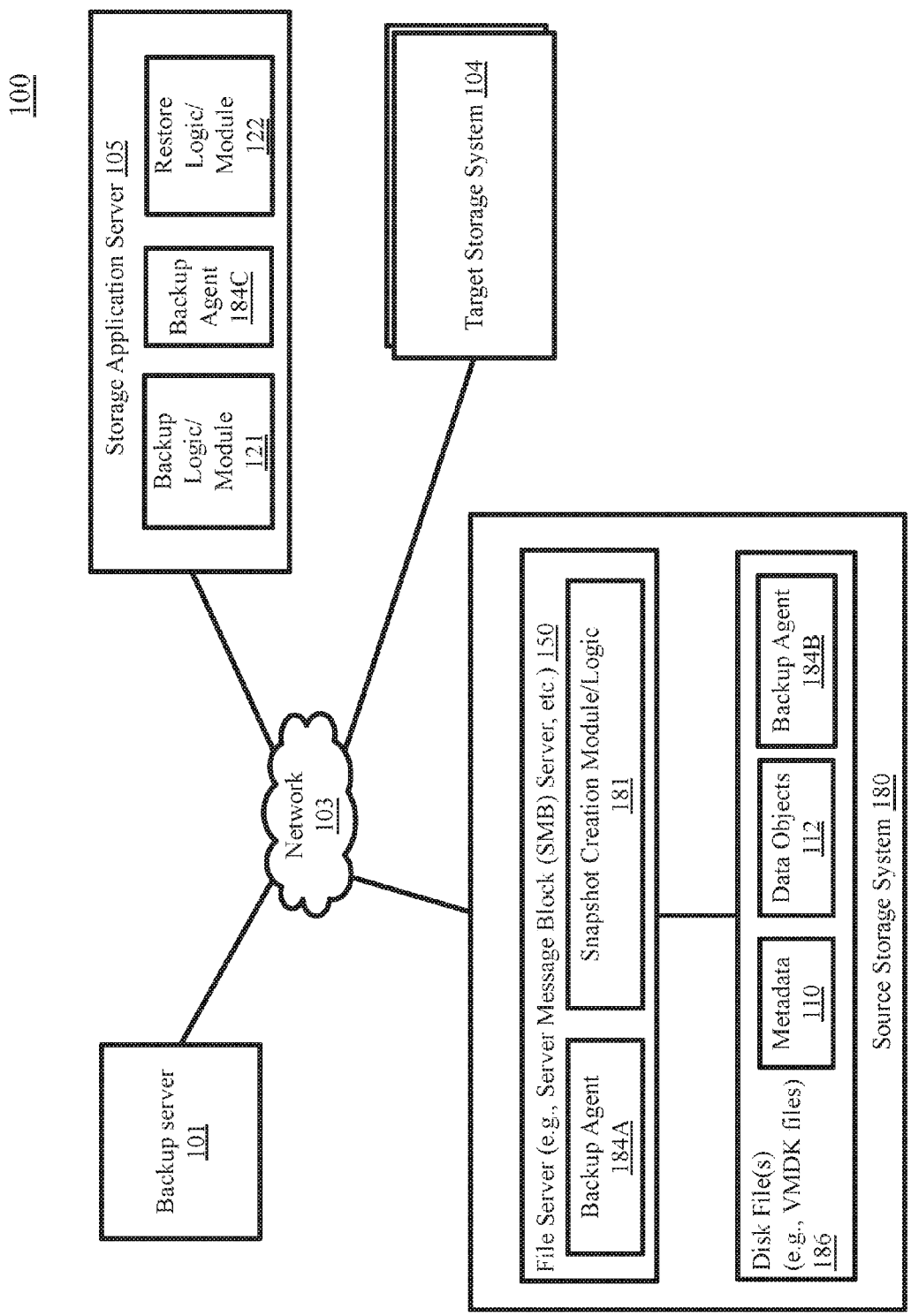
FIG. 1 is a block diagram illustrating storage system, in accordance with one of the embodiments described herein.

Once a malware attack is resolved on a production image, backup images of the production image may remain infected. In some instances, system administrators may be unaware that a backup image is infected or, an administrator is aware of an infection, the administrator may not be aware of the nature of the infection or the set of backup images that contain the infection. Possible outcomes of this scenario range from forgetting about the infection in the backups, re-infecting a system after restoring a compromised backup image assuming all backup data is compromised, and destroying all backups of a previously infected system, which may result in significant loss of data.

Embodiments described herein provide for a system and method of cleaning up the backup images (e.g., "rewriting history") and CDP logs by removing malware from backup images. Removing malware from backup images can prevent secondary infection that may occur should the backup image be restored. The techniques described herein can also be applied to template images of virtual machines, containers, and other storage objects on a data storage system. These techniques provide a general mechanism that allows a system administrator to retain potentially infected backup images while cleaning the images from possible infection.

In one embodiment, cleaning malware from backup data can be performed by selecting and isolating a data storage system that is known to be infected with malware, where the malware has a known cleaning or removal process. The data storage system is isolated from production networks or storage devices to ensure that the infected data storage system does not receive production data I/O requests. An I/O recording session is started in which all write activities to the data storage system are recorded. During the I/O recording session, the malware removal technique is applied. The malware removal technique can be any malware removal technique known in the art and can include anti-malware software or logic provided by commercial anti-malware vendors. Once the malware removal process is complete, the I/O recording session can be stopped. The system can then present a log or report detailing the locations of files affected by the anti-malware logic. In one embodiment, the log or report can be edited to remove select I/O requests recorded during the I/O recording session, for example to remove spurious I/O operations that are not related to the malware cleaning.

Once the cleanup changes are finalized, the system can apply those cleanup changes to the backup images. Instead of performing a complete re-scan of the backup images to locate the compromised data to be cleaned, the system can modify only the storage locations known to be infected. The known storage locations can be modified using the known clean data and the I/O requests to the storage system to perform such cleaning is recorded. Using the I/O requests that are recorded during the I/O recording session, the system can generate a list of locations and data to be replaced with cleaned data. The malware infections, including any boot record infections, can be cleaned from the backup images without requiring scan of each image to locate the malware.

Once a backup system has been cleaned, the backup image can be restored to a test system to verify proper system operation and a malware signature scan can be performed to verify that the system has been properly cleaned. Additionally, an automatic verification scan can be performed using the I/O record to verify that the cleanup changes were successfully applied and that each location to be cleaned contains the proper clean data. The above process can be repeated for each system to be cleaned. Additionally, multiple instances of a backup image can be cleaned. For example, a backup image may have a local replica and a remote replica that is located at a remote, network-accessible location. The I/O record gathered during the initial malware cleaning can then be applied in parallel to the local and remote images.

Additionally, I/O records can be gathered and applied for subsets of images. Via the ability to edit I/O requests after they have been recorded, the I/O record associated with the malware cleanup process for a subset of an image can be isolated and applied to other systems that contain a strict subset of the originally cleaned image. For example, the subset of I/O requests can then be applied for images of different systems that do not contain identical system images but share a specific set of data, such as specific database snapshot that is known to be identical.

The following description and drawings are illustrative of the embodiments described herein and are not to be construed as limiting any of the embodiments described herein. Various embodiments and aspects of the embodiments set forth herein will be described with reference to details discussed below, and the accompanying drawings will illustrate the various embodiments. Numerous specific details are described to provide a thorough understanding of various embodiments described herein. However, in certain instances, well-known or conventional details are not described in order to provide a concise discussion of the embodiments described herein.

Reference in the specification to "one embodiment," "an embodiment," "alternate embodiment," "another embodiment," and their respective variations means that a particular feature, structure, or characteristic described in connection with the embodiment can be included in at least one embodiment of the invention. The appearances of the phrases "in one embodiment," "in an embodiment," "in alternate embodiment," "in another embodiment," and their respective variations in various places in the specification do not necessarily refer to the same embodiment.

In the following description and claims, the terms "coupled" and "connected," along with their derivatives, may be used. It should be understood that these terms are not intended as synonyms for each other. "Coupled" and its variations are used to indicate that two or more devices or components, which may or may not be in direct physical or electrical contact with each other, co-operate or interact with each other. "Connected" and its variations are used to indicate the establishment of communication between two or more devices or components that are coupled with each other. For example, two devices that are connected to each other are communicatively coupled to each other. "Communication" and its variations includes at least one of transmitting or forwarding of information to a device or component or receiving of information by a device or component.

Backup System Overview

FIG. 1 is a block diagram illustrating storage system 100, in accordance with one of the embodiments described herein. The storage system 100 includes a backup server 101 coupled to a source storage system 180, a target storage system 104, and a storage application server 105 over a network 103. In one embodiment, the backup server 101 is responsible for managing the backup of a plurality of storage systems by directing the backing up and restoring of files, folders, databases, and hard drives, solid state drives, etc., over a network in order to prevent the loss of data in the event of a hard drive failure, user error, disaster, or accident. In one embodiment, backup server 101 manages backups by making requests to storage application server 105. For example, and in one embodiment, the backup server 101 manages backups based on requests to backup data that are received from other clients being operated by users (e.g., a personal computer, workstation, etc.). In this example, the backup server 101 processes the received requests and makes backup requests to storage application server 105. In this way, backup server 101 acts a system level client that makes requests to backup data on the backend. Alternatively, backup server 101 may be a primary storage system (e.g., local data center) that provides storage to one or more clients, which may periodically back up the content stored therein to a backup storage system (e.g., a disaster recovery site or system), such as the target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. It is to be appreciated that there can be more than one client in storage system 100.

The network 103 may be any type of network, such as a local area network (LAN), a wide area network (WAN) such as the Internet, a fiber network, a storage network, or a combination thereof. A portion of the network may be wired, wireless, or a combination of wired and wireless. The backup server 101 may be in physical proximity or may be physically remote from client(s), source storage system 180, storage application server 105, or target storage system 104. Moreover, each of the backup server 101, source storage system 180, storage application server 105, and target storage system 104 may be in physical proximity with each other or may be physically remote from each other.

The target storage system 104 may include any type of server or cluster of servers. For example, the target storage system 104 may include a storage server used for at least one of a variety of different purposes—for example, to provide multiple users with access to shared data and/or to back up mission critical data. The target storage system 104 may include, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. The target storage system 104 may have a distributed architecture, or all of its components may be integrated into a single unit. The target storage system 104 may be implemented as part of an archive and/or backup storage system such as a deduplication storage system available from EMC® Corporation of Hopkinton, Mass.

The source storage system 180 may include any type of server or cluster of servers, which may have the same or similar architecture as the architecture of target storage system 104. In one embodiment, source storage system 180 includes a file server 150 and one or more disk file(s) 186. The source storage system 180 may include a storage device having an appliance used to provide NAS capability or a unified storage device (e.g., one which combines NAS and SAN capabilities, a near-line storage device, a DAS device, a tape backup device, or essentially any other type of data storage device. In one embodiment, the file server 150 is an appliance with NAS capability that implements at least one file sharing protocol (e.g., CIFS, SMB, Samba, etc.). The file server 150 can include one or more hard disk drives, solid state drives, or other storage devices, which may be arranged in logical, redundant storage containers (RAID).

In one embodiment, the file server 150 implements a file system (also known as a "filesystem") that controls how data is stored and retrieved. Various file systems may be used. In one embodiment the file server 150 implements the server message block (SMB) protocol, a dialect of the SMB protocol (e.g., CIFS), or an adaptation of the SMB protocol (e.g., Samba), or another protocol that allows applications to remotely read, create, and update files on the file server 150.

In one embodiment, the file server 150 includes a first backup agent 184A, which provides a backup workflow for the one or more file sharing protocols being implemented by file server 150. In one embodiment, the one or more file sharing protocols include at least one of SMB, CIFS, or Samba. The file server 150, in one embodiment, also includes snapshot creation module/logic 181 for creating a snapshot of data to be backed up. The snapshot records information of the data at a point in time. It may be a snapshot of the entire file system, or a snapshot of one or more individual files. The snapshot may include information such as data segment references, content handles, etc.

The source storage system 180 also includes one or more disk file(s) 186, which include the data to be backed up to target storage system 104. In one embodiment, the data to be backed up includes metadata 110 and data objects 112. The disk file(s) 186 can be virtual machine (VM) disk file(s) that are the content files of one or more VMs. A virtual machine (VM) represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machine, such as, for example, hardware emulation, full virtualization, para-virtualization, and operating system-level virtualization virtual machines. Different virtual machines hosted by a server (e.g., file server 150, storage application server 105) or a storage system (e.g., source storage system 180, target storage system 104) may have the same or different privilege levels for accessing different resources of the server or storage system. The disk file(s) 186 can also include a second backup agent 184B, which coordinates with the first backup agent 184A to provide a backup workflow for the one or more file sharing protocols being implemented by file server 150.

Source storage system 180 may have a distributed architecture, or all of its components may be integrated into a single unit. Source storage system 180 may be implemented as part of an archive and/or backup system, or a disaster recovery system, such as a continuous replication storage system available from EMC® Corporation of Hopkinton, Mass. In one embodiment, the source storage system 180 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment described herein. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. Again, the architecture of the source storage system 180 and the target storage system 104 may be identical or similar. The description provided in connection with the source storage system 180 may be applied to the target storage system 104, or vice versa.

The storage application server 105 can coordinate with the target storage system 104, source storage system 180, and backup server 101 to run various backup operations. The storage application server 105 handles all application operations between the backup server 101 (e.g., a backup server) and the backend of the storage system 100—i.e., source storage system 180 and target storage system 104. The storage application server 105 includes any storage service related components configured or adapted to provide storage services (e.g., storage as a service) to a variety of backup servers 101 using any access protocols as is known in the art. For example, storage application server 105 may include backup logic/module 121 and restore logic/module 122. A backup logic/module 121 is configured to receive requests to back up data from a backup server 101 and to report to the backup server 101 the successful or unsuccessful backing up of data from source storage system 180 to target storage system 104. Restore logic 122 is configured to retrieve and restore backup data from target storage system 104 back to source storage system 180 and to report the successful or unsuccessful restoration of the backed up data to backup server 101. The storage application server 105 also includes a third backup agent 184C, which works with at least one of backup agents 184A-B to provide an improved backup workflow for one or more file sharing protocols (e.g., SMB, CIFS, Samba, etc.) being implemented by file server 150. In one embodiment, the application server 105 may be integrated with the backup server 101 as a single server or cluster of servers.

In one embodiment of the storage system 100, the backup logic/module 121 is configured to receive requests to back up data from the backup server 101 and to report the successful or unsuccessful storage of the backed up data to the target storage system 104. In one embodiment, a user (e.g., an administrator) initiates a backup request, directly or through a backup schedule within the backup server 101. The backup server 101 directs the request to the backup logic/module 121, which in turn provides the request to the third backup agent 184C.

In one embodiment the backup server 101 directs the continuous backup of data from the source storage system 180 via a journaling mechanism that duplicates write operations to the storage system to a remote copy of the source storage system 180 that is stored on the target storage system 104 over the network 103. The journaling can be performed by the first backup agent 184A, which can store write I/O activity to a journal managed by the second backup agent, or otherwise stored in associated with the disk files 186 on the source storage system 180. A remote journal can also exist on the target storage system 104. The remote journal can be used to apply write I/O activity to a remote copy of the disk files 186.

As shown in FIG. 1, the to-be-backed-up data (e.g., data objects 112 and metadata 110) resides at the source storage system 180, which includes file server 150 that is implementing a network file sharing protocol such as, but not limited to, the SMB protocol. The first backup agent 184A receives the request from the third backup agent 184C and directs snapshot creation module/logic 181 to create a snapshot of to-be-backed-up data. In response to the snapshot being created, file server 150 provides the snapshot to target storage system 104 for storage.

Note that some or all of the components as shown and described above (e.g., storage service application server 105, each of backup agents 184A-C, and/or snapshot creation module/logic 181 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Cleaning Malware from Backup Data

In the event of a rapidly discovered malware infection of any of the data on the source storage system 180, the source storage system can be quickly cleaned of the infection and any issues created by the malware can be resolved. An alternative method that can be employed in the event if a malware infection is to search backup copies or snapshot of data on the source storage system to find a copy of an object that is not infected. The uninfected copy can then be restored from backup. However, for malware infections that go undetected for a period of time, one or more backup copies of the data object can also be infected. While it may be possible to use sequence scanning techniques to detect the existence of malware with known sequences (e.g., via signature based scanning), it may not be possible to directly clean the backup data without restoring the data to a system and executing anti-malware logic on the restored system. However, using the journaling and I/O recording capability provided by continuous backup logic, any malware infections present on backup or snapshot images can be replaced by clean data without a manual restore-cleanup cycle.

Figure 2:
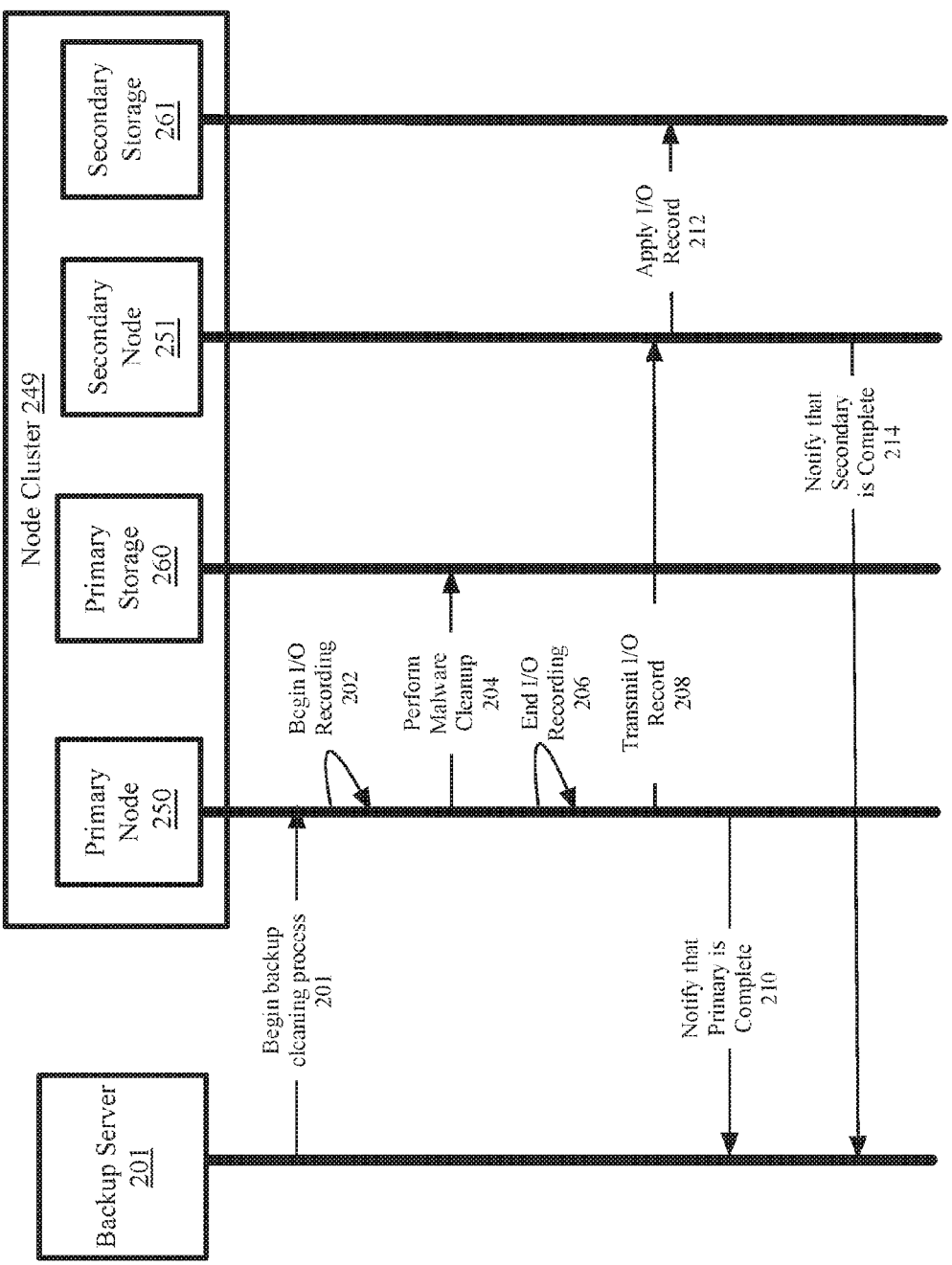
FIG. 2 is a transactional diagram illustrating a backup cleaning process, according to an embodiment.

FIG. 2 is a transactional diagram illustrating a backup cleaning process 200, according to an embodiment. The backup cleaning process 200 can be performed by a backup logic such as the backup logic/module 121 on the storage application server 105 of FIG. 1, or at least in part by the Backup Agents 184A-C on the source storage system 180 and storage application server 105 of FIG. 1. In one embodiment the backup cleaning process can be performed upon a request issued by a backup server 201, which may be similar to the backup server 101 of FIG. 1. The backup server can then direct a node cluster 249 including a primary node 250 and one or more secondary nodes 251. The primary node 250 can connect to primary storage 260. The secondary node 251 can connect to secondary storage 261. The primary storage 260 and the secondary storage 251 may be a storage device or a distributed storage system.

The backup server 201 can perform issue a request to restore a backup to be cleaned (201). The primary node 250 can then begin an I/O recording session by performing an operation (202) to begin I/O recording. During the I/O recording session, all write activities to the primary storage 260 are recorded. The primary node 250 can then perform an operation (204) to direct malware removal or anti-malware logic executing on the primary node 250 to perform malware cleanup on the primary storage 260. The malware removal logic can be any malware removal logic known in the art and can include anti-malware software or logic provided by commercial anti-malware vendors. The anti-malware logic may execute as an application or a virtual application executing on the primary node 250, or may execute on a processing system remote from the primary node 250 at the direction of the primary node 250. During the malware cleanup operation, the I/O recording session logs write I/O requests or commands.

Once the malware removal process is complete, the I/O recording session can be stopped. Accordingly, the primary node 250 can perform an operation (206) to end I/O recording. The primary node 250 can then compile a log or report detailing the locations of files changed by the anti-malware logic. In one embodiment, the log or report can be edited to remove select I/O requests recorded during the I/O recording session. Once the cleanup changes are finalized, the system can apply those cleanup changes to the backup images. The primary node 250 can then transmit the I/O record (208) to a secondary node 251. Instead of performing a complete re-scan of the backup images to locate the compromised data to be cleaned, the secondary node 251 can then apply the I/O record (212) to the secondary storage 261. Using the I/O record, the secondary node 251 can modify only the storage locations afflicted with the malware infection. The malware infections, including any boot record infections, can be cleaned from the backup images without requiring scan of each image to locate the malware.

After performing the operation (208) to transmit the I/O record to the secondary node 251, the primary node 250 can perform an operation (210) to notify the backup server 201 that the primary node 250 has completed its malware cleaning operation on the primary storage 260. After performing the operation (212) to apply the I/O record to the secondary storage 261, the secondary node 251 can perform an operation (214) to notify the backup server 201 that the secondary is complete. Alternatively, for example, when the backup cleanup operation is performed in a federated architecture including multiple instances of the secondary node 251, each instance of the secondary node 251 can notify the primary node 250 that the operation (212) to apply the I/O record is complete and once each instance of the secondary node 251 is complete the primary node can notify the backup server 201.

Once a backup system has been cleaned, the backup image can be restored to a test system to verify proper system operation and a malware signature scan can be performed to verify that the system has been properly cleaned. Additionally, an automatic verification scan can be performed using the I/O record to verify that the cleanup changes were successfully applied and that each location to be cleaned contains the proper clean data. The above process can be repeated for each system to be cleaned.

Figure 3:
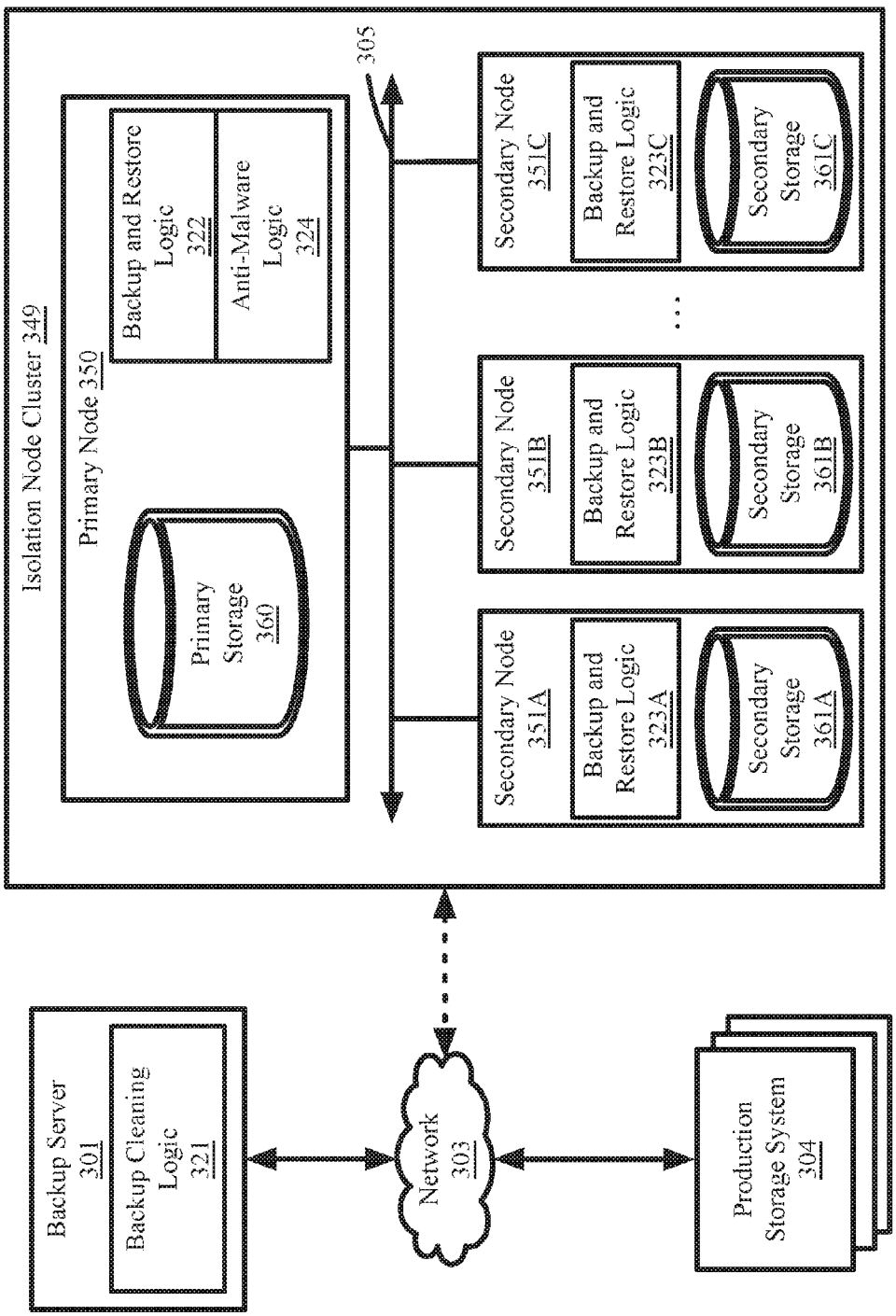
FIG. 3 is a block diagram of a backup cleaning system configured to clean malware from backup data, according to an embodiment.

FIG. 3 is a block diagram of a backup cleaning system 300 configured to clean malware from backup data, according to an embodiment. The backup cleaning system 300 includes, but is not limited to, an isolation node cluster 349, a backup server 301, and a production storage system 304. The backup server 301 and the production storage system 304 may be connected to and in communication over a primary network 303, which may be a production network. The isolation node cluster 349 may include multiple nodes including, but not limited to a primary node 350 and secondary nodes 351A-C. Each one of the primary node 350 and secondary nodes 351A-C can be a computing system that includes, but is not limited to, a central processing unit, memory, and one or more storage devices for storing or backing up data (e.g., databases, VM images, etc.). In one embodiment, each of the primary node 350 and secondary nodes 351A-C can also be sub-clusters containing multiple processing units or multiple VMs in an active-active configuration. The storage devices can be internal storage devices, directly attached storage devices, network based storage devices, or a combination thereof. The storage devices associated with the primary node are represented as primary storage 360. The storage devices associated with the secondary nodes 351A-C are represented as secondary storage 361A-C. The primary node 350 and secondary nodes 351A-C can communicate over a secondary network 305, which may be separate from the primary network 303 to which the backup server and the production storage system 304 are connected. While represented as internal, each of the primary storage 360 and secondary storage 361A-C may be network attached storage devices coupled to the respective nodes via the secondary network 305.

Initially, each of the components of the backup cleaning system 300 can communicate with the primary network 303. When the backup cleaning process is to begin, backup cleaning logic 321 on the backup server 301 may transmit a set of messages to backup and restore logic 322 on the primary node 350. In one embodiment, the messages include a command to isolate the isolation node cluster 349 from the production network, which can include disconnecting the primary network 303 from the secondary network 305, for example, via a firewall or access policy, a routing table change, or by disabling a network link between the primary network 303 and the secondary network 305.

Once the isolation node cluster 349 is isolated, the backup and restore logic 322 on the primary node 350, based on a command sequence previously provided by the backup cleaning logic 321 on the backup server 301, can perform malware cleanup operations on the primary storage, or restore an infected backup to the primary storage 360 if a cleanup record is to be generated based on a backup image. Anti-malware logic 324 on the primary node 350 can then perform malware cleanup operations on the primary storage 360. The write operations performed to the primary storage 360 by the anti-malware logic 324 can be recorded by the backup and restore logic 322 using a variety of mechanisms. In one embodiment the backup and restore logic 322 and anti-malware logic can execute within the same computational domain (e.g., processing system, VM, etc.) such that the backup and restore logic 322 can directly log I/O requests made by the anti-malware logic 324. In one embodiment the backup and restore logic 322 and anti-malware logic each execute as virtual appliances managed by a VMM on the primary node.

The backup and restore logic 322 can be configured to log I/O requests made by the anti-malware logic 324 with the assistance of the VMM. In one embodiment, the primary node 350 connects to the primary storage 360 via a SAN fabric than includes logic to replicate write I/O requests to the primary storage. The replicated write I/O requests can be received by the backup and restore logic 322 and be stored as an I/O record. In one embodiment the primary storage 360 is managed by or a component of a storage system that includes or is managed by a continuous data protection (CDP) or continuous backup system that automatically journals any change made to the primary storage 360. The CDP journal can then be leveraged to generate an I/O record of the changes to the primary storage 360 performed by the anti-malware logic 324. Once the anti-malware logic 324 completes the cleaning or removal of malware infected data objects from the primary storage 360, the I/O record of the cleanup activities can be stored by the backup and restore logic 322.

In one embodiment the backup and restore logic 322 can present, via a graphical user interface, a report of the operations performed during the cleaning process. The report can include a detailed listing of the I/O operations or I/O requests performed on the primary storage 360. The report can also include the locations of the files and the changes performed during cleanup. In one embodiment an operator of the backup and restore logic (e.g., system administrator) can edit or remove some of the I/O operations or requests in the I/O record. The system administrator can remove entries from the I/O record, for example, if the system administrator considers some of the operations or requests to be unnecessary, or if the I/O record is to be tailored to a specific subset of the data.

Once the record of the cleanup changes is finalized, the backup cleaning system can apply the record of changes to the remaining backup images. The I/O record can be transmitted to one or more of the secondary nodes 351A-C. The secondary nodes 351A-C can then apply the changes stored in the I/O records to backup images on the secondary storage using instances of the backup and restore logic 323A-C executing on the secondary nodes 351A-C. Multiple secondary nodes 351A-C can be used to clean multiple backup images in parallel or a single one of the secondary nodes 351A-C can clean multiple instances of the secondary storage 361A-C in a sequential or parallel manner.

In one embodiment, for the I/O record based backup cleaning to be applied to backup images, the backup that are to be cleaned should be at least partially related to the image that is used to generate the I/O record. For example, the primary storage 360 can contain a primary (e.g., active) replica of a database and the secondary storage 361A-C can contain secondary (e.g., passive) replicas of a database, for example, an e-mail database that may contain malware infected e-mail attachments. The primary storage 360 can also contain primary storage associated with a VM cluster (e.g., VMDK files, VHD files, etc.), while the secondary storage 361A-C contain passive or remote backups of the primary storage. The primary storage 360 can also contain a primary system restore image of a data processing system, including one or more boot images associated with the data processing system. The anti-malware logic 324 can be used to remove malware infections from the primary system restore image, including any existing boot record infections, and secondary images stored on the secondary storage 361A-C can be cleaned using the I/O record gathered while cleaning the primary restore image on the primary storage 360.

In one embodiment, the I/O record can be tailed to clean only a subset of the data stored on a backup image. For example, the primary storage may contain a specific set of data, such as data associated with a specific user account on server, which is common across multiple backup images that may or may not have other data in common. If the specific subset of data on the primary storage 360 is cleaned of malware, the I/O record for the specific subset of data can be trimmed and malware cleanup can be performed for any backup image containing the specific subset of cleaned data.

The specific data stored in the I/O record can vary. In one embodiment, the I/O record includes a list of I/O requests to a storage system, such as a distributed storage system or a storage array. The I/O requests are then translated by the storage system into lower level commands to the individual storage devices or sub-systems. In one embodiment, the I/O record is a system level record of I/O requests or commands submitted to an I/O subsystem of a data processing system. In one embodiment, the I/O record may be specific to a VMM environment, where the backup cleanup is performed within a virtual machine environment. In general, the level of the storage hierarchy in which the I/O record is gathered is the level at which the I/O record is to be applied to perform malware cleanup on the backup images. However, in one embodiment, for example, for vertically integrated storage solutions, I/O records gathered at one level can be translated into a higher or lower level of the hierarchy as needed.

Once the isolation node cluster 349 has completed the malware cleanup operation for the backup images, the isolation node cluster 349 can be reconnected to the production environment, for example, by re-linking the secondary network 305 with the primary network 303. The cleaned backup images may then be re-integrated into the production storage system 304.

Figure 4:
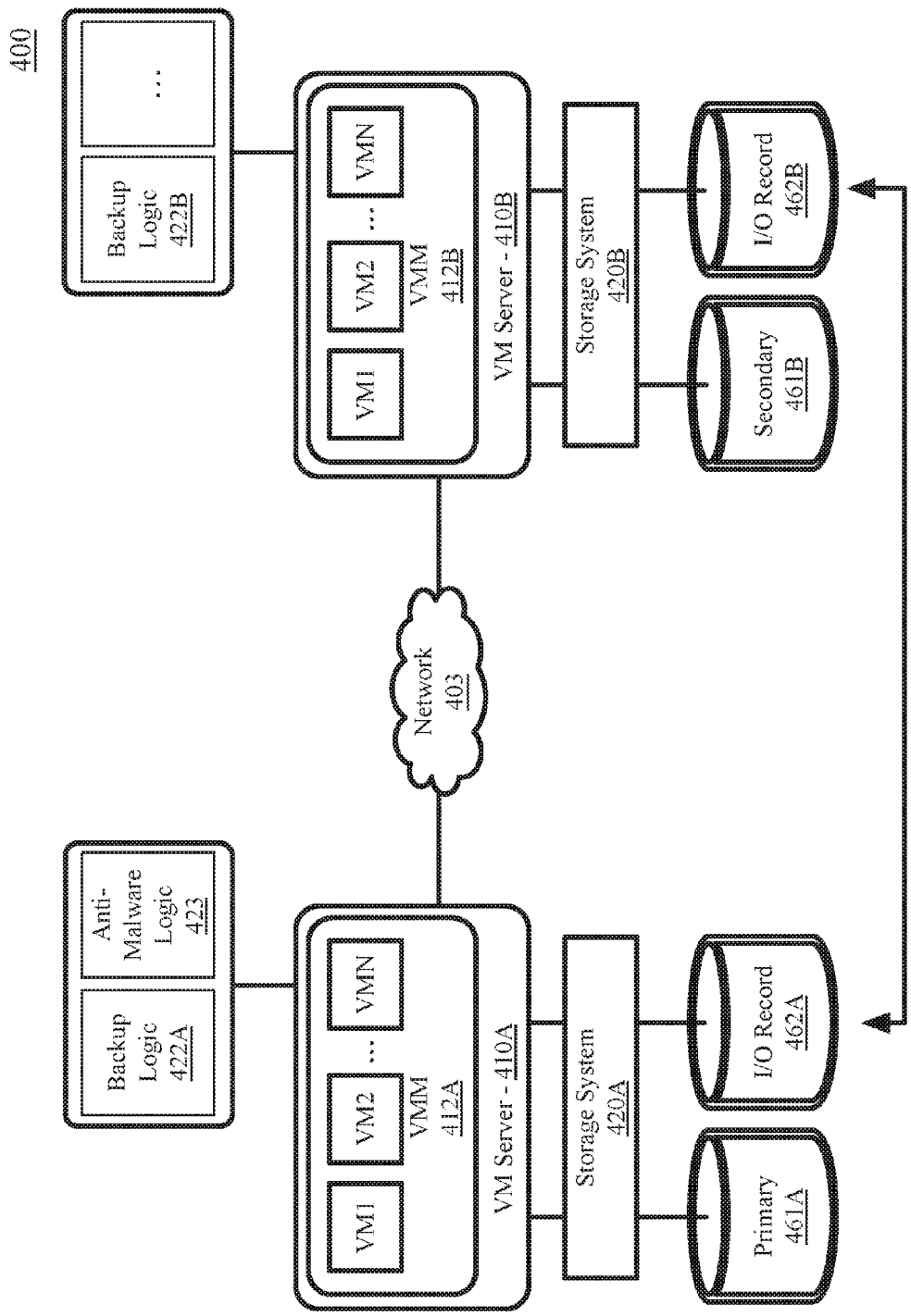
FIG. 4 is a block diagram of cleaning backup images in a virtual machine environment 400, according to an embodiment.

FIG. 4 is a block diagram of cleaning backup images in a virtual machine environment 400, according to an embodiment. In one embodiment the virtual machine environment 400 includes multiple VM servers 410A-B coupled via a network 403. Each VM server 410A-B includes a VMM 412A-B hosting multiple VMs (VM1-VMN). Each VM server 420A-B can couple to a storage system 420A-B that includes or couples with one or more storage devices.

Embodiments described herein enable the cleaning of backup images housed remotely over a network. For example, backup logic 422A executing on a VM (e.g., one of VM1-VMN) of a first VM server 410A can begin a backup cleaning process for a primary replica 461A of a storage volume, such as, for example, a clustered storage volume storing images for each of the VMs on the first VM server 410A. The backup logic 422A can enable an I/O recording session to generate and local I/O record 462A and then request anti-malware logic 423 to begin a malware cleaning process for the primary replica 461A. In one embodiment the local I/O record 462A can be mirrored over the network 403 to a remote I/O record 462B. Using the remote I/O record, backup logic 422B on a second VM server 410B can clean a secondary replica of the storage volume, which may be a remote mirror of the primary replica 461A. Such process enables the cleaning of the remote replica without the use of anti-malware logic on the second VM server 410B.

In one embodiment the virtual machine environment 400 includes a continuous data protection system that can mirror I/O operations in real time or near real time, such that the I/O record 462A of the cleaning operations applied to the primary replica 461A are mirrored to the remote I/O record 462B and applied to the secondary replica 461B as the I/O operations occur. In one embodiment, even when the virtual machine environment 400 is configured for continuous data protection, the I/O record for anti-malware operations on the primary replica 461A can be batched and reviewed or edited before being transmitted to the remote I/O record 462B and applied to the secondary replica 461B.

Figure 5:
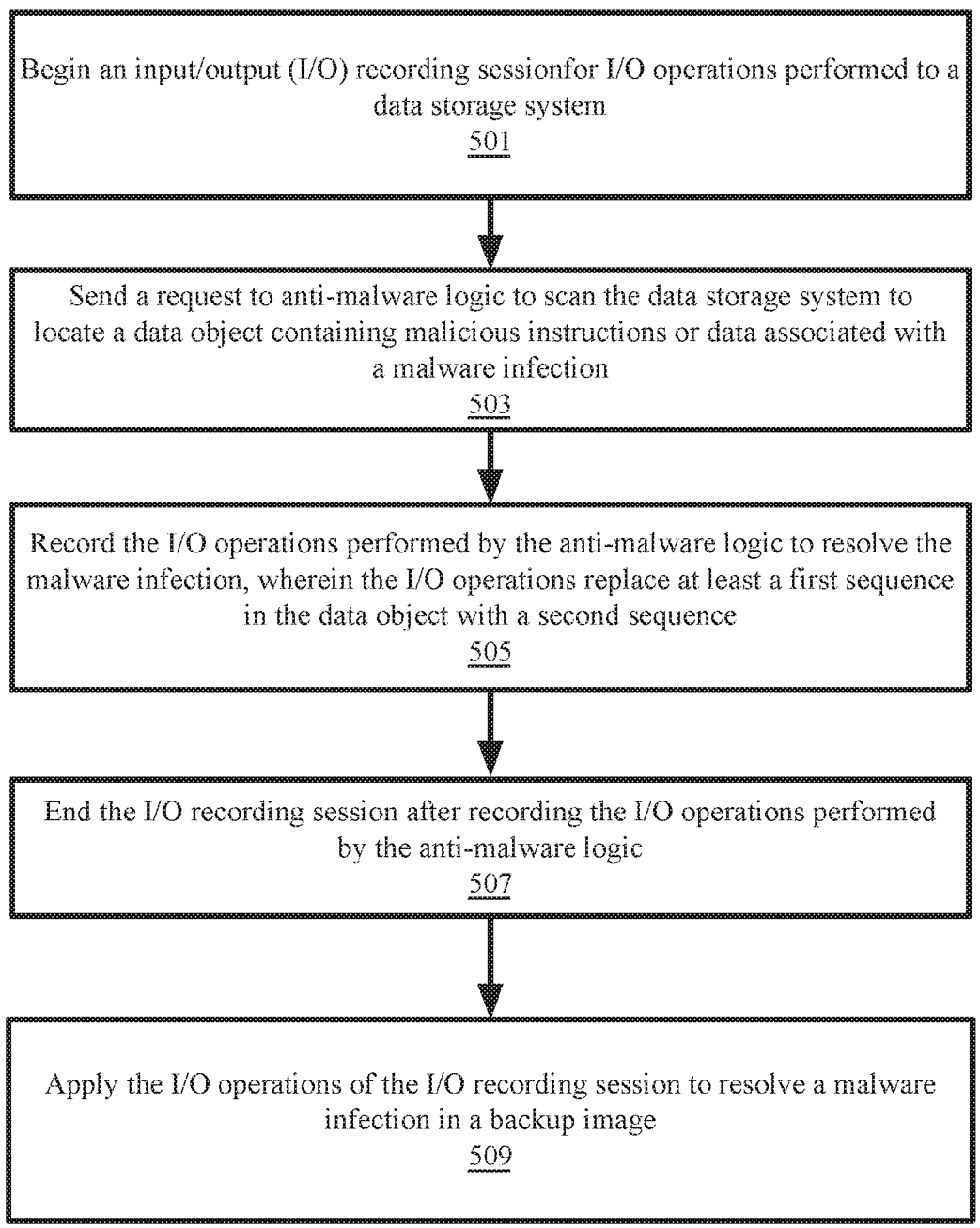
FIG. 5 is a flow diagram of logic for cleaning backup images, according to an embodiment.

FIG. 5 is a flow diagram of backup image cleaning logic 500 for cleaning backup images, according to an embodiment. The backup image cleaning logic 500 can cleaning backup images by removing malware instructions or data and can be performed by the backup logic/module 121 or restore logic/module 122 as in FIG. 1, which may each include, for example, backup cleaning logic 321 as in FIG. 3.

At block 501, the backup image cleaning logic 500 or an equivalent backup cleaning agent can begin an I/O recording session for I/O operations performed to a data storage system. At block 503, the backup image cleaning logic can send a request to anti-malware logic to scan the data storage system to locate an object containing malicious instructions or data associated with a malware infection. At block 505, the backup image cleaning logic 500 can record the I/O operations performed by the anti-malware logic to resolve the malware infection, where in the I/O operations replace at least a first sequence in the data object with the second sequence. At block 507, the backup image cleaning logic 500 can end the I/O recording session after recording the I/O operations performed by the anti-malware logic. At block 509, the backup image cleaning logic 500 can apply the I/O operations of the I/O recording session to resolve a malware infection in a backup image. In one embodiment the I/O record can be reviewed and edited before being applied to the backup image, such that extraneous I/O operations can be removed or the cleaning operations can be limited to a subset of the data in the backup image.

Figure 6:
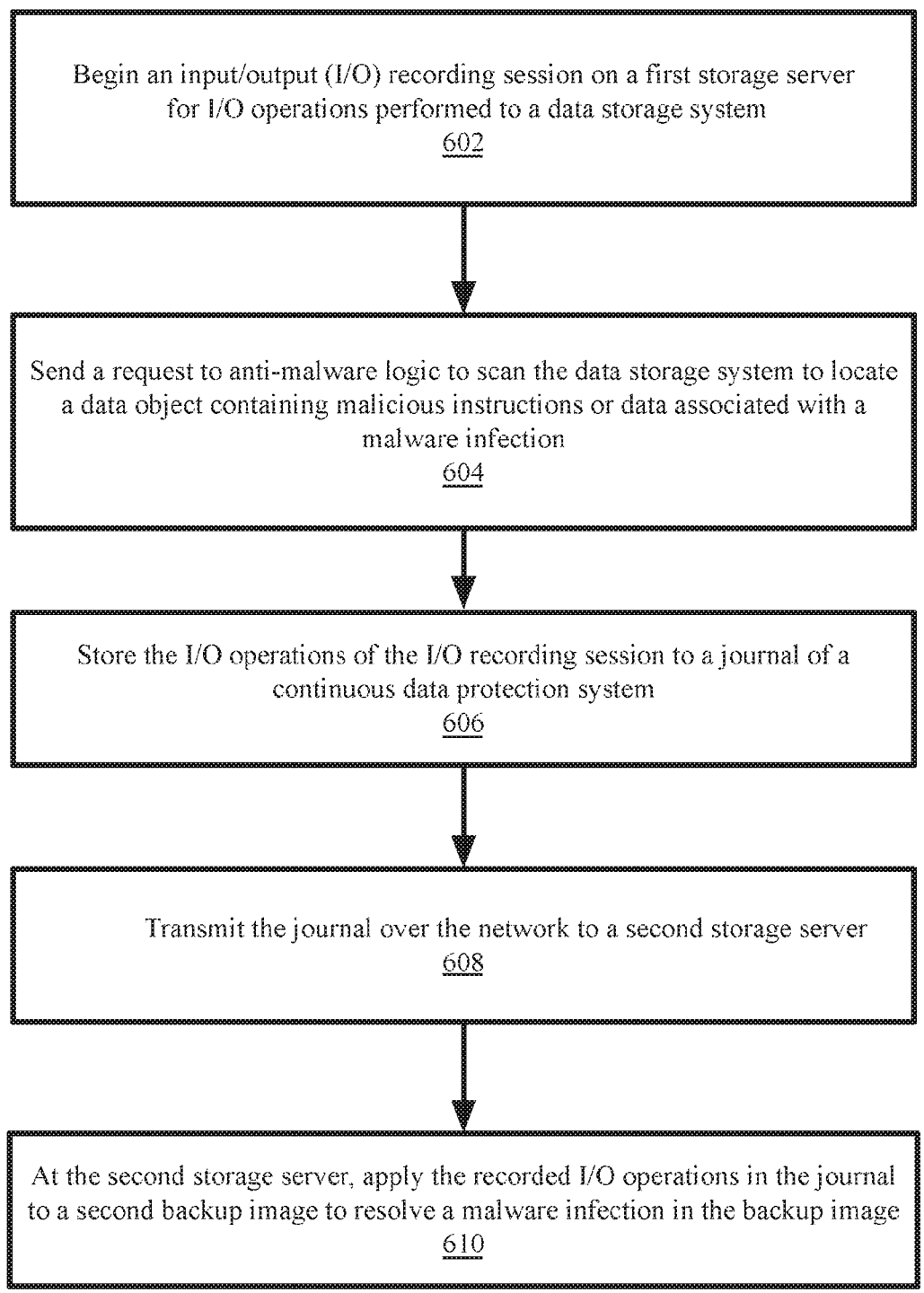
FIG. 6 is a flow diagram of logic for cleaning remote backup images, according to an embodiment

FIG. 6 is a flow diagram of remote backup image cleaning logic 600, according to an embodiment. The remote backup image cleaning logic 600 can be used for cleaning backup at a network connected backup server based on, I/O operations performed by a different network connected backup server, for example, as shown in FIG. 4. In one embodiment, multiple backup images can be cleaned simultaneously by mirroring anti-malware operations to a remote I/O record.

At block 602, the remote backup image cleaning logic 600 or an equivalent backup cleaning agent can begin an I/O recording session on a first storage server for I/O operations performed to a data storage system. At block 604, the remote backup image cleaning logic can send a request to anti-malware logic to scan the data storage system to locate an object containing malicious instructions or data associated with a malware infection. At block 606, the remote backup image cleaning logic 600 can store the I/O operations of the I/O recording session to a journal of a continuous data protection system. At block 608, the remote backup image cleaning logic 600 can transmit the journal over the network to a second storage server. At block 610, the remote backup image cleaning logic 600 can apply the I/O operations in the journal to a second backup image to resolve a malware infection in the backup image. In one embodiment the I/O operations applied to the backup image can be applied synchronously to other backup images. In one embodiment, I/O operations can be batched and edited before being applied to other backup images.

Figure 7:
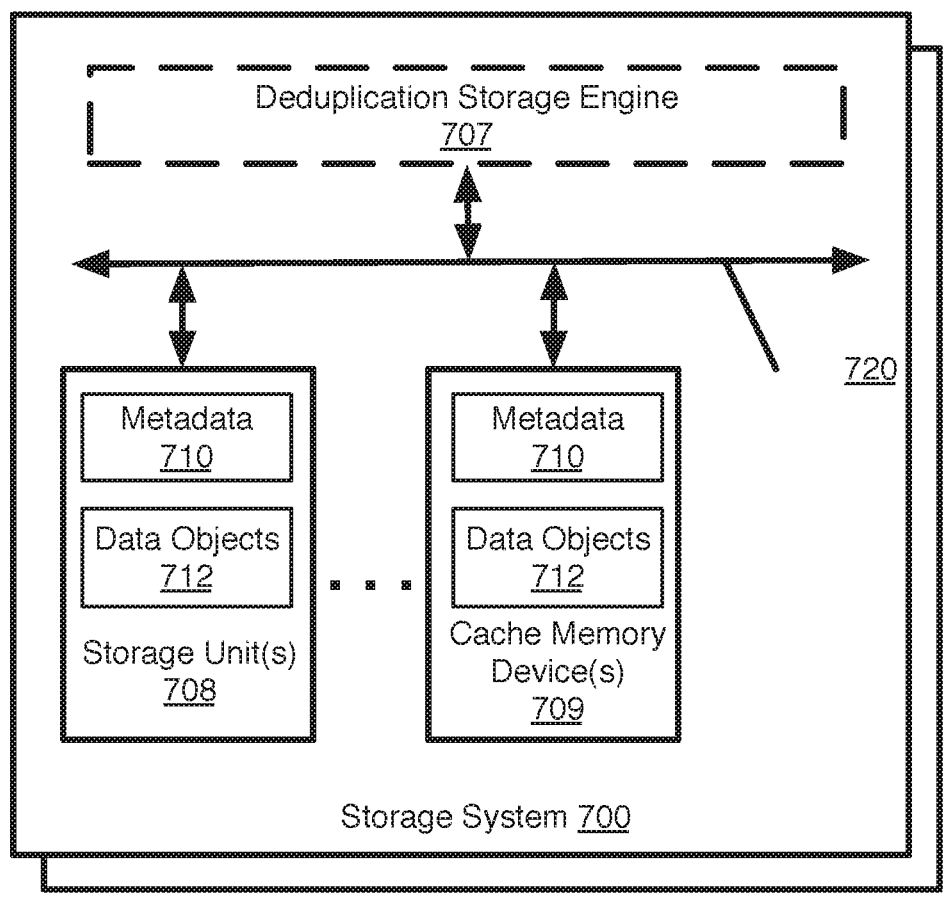
FIG. 7 is a block diagram illustrating a storage system that may represent any one of the storage systems described herein.

FIG. 7 is a block diagram illustrating a storage system 700 that may represent any one of the storage systems described herein. The storage system 700 can be configured as a target storage system, such as the target storage system 104 as in FIGS. 1-3, a storage system of the set of target storage nodes 412A-N as in FIG. 4, or as any source storage system described herein. The storage system 800 may include or represent any type of server or a cluster of one or more servers (e.g., cloud servers). For example, the storage system 800 may be a storage server used for various different purposes, such as to provide multiple users or client systems with access to shared data and/or to back up (or restore) data (e.g., mission critical data). The storage system 700 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. The storage system 700 may further provide storage services via an object-based protocol and Hadoop distributed file system (HDFS) protocol. In one embodiment the storage system 700 includes one or more storage units or devices 708 or one or more cache memory devices 709 (also referred to as cache or cache devices). In one embodiment the storage system 700 additionally includes deduplication logic 707. The deduplication logic 707, storage unit(s) 708, and cache memory device(s) 709 may be implemented in software, hardware, or a combination thereof.

The deduplication logic 707, storage unit(s) 708, or cache memory device(s) 709 may be communicatively coupled via an interconnect 720, which may be a bus and/or a network (e.g., a storage network or a network similar to network 103 of FIG. 1). The storage unit(s) 708 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. The storage units 708 may also be or include optical disks such as CD-ROM or DVD based storage, magnetic tape storage, magneto-optical (MO) storage media, solid state disks, flash memory based devices, or any other type of non-volatile storage devices suitable for storing large volumes of data. Additionally, the storage units 708 may also be combinations of such devices. Data stored in the storage units may be stored in a compressed form (e.g., lossless compression: HUFFMAN coding, LEMPEL-ZIV WELCH coding; delta encoding; a reference to a segment plus a difference; etc.). In one embodiment, different storage units may use different compression methods (e.g., main or active storage unit from other storage units, one storage unit from another storage unit, etc.).

The cache memory device(s) 709 include at least one of a volatile memory device or a non-volatile memory device. For example, and in one embodiment, the cache memory device(s) 709 can be a non-volatile memory device such as a solid state drive (SSD), a flash memory device, a flash-based memory device, a peripheral component interconnect express (PCIe) connected flash memory, solid state device (SSD), magnetic tape, magneto-optical (MO) storage media, or other known non-volatile memory device that is known to be used as a cache memory device.

The storage unit(s) 708 and the cache memory device(s) 709 can store data objects 712 and metadata objects 710 that describe the data objects 712. The metadata 710 of each storage unit and/or cache memory device includes information to provide access to files of the storage unit or cache memory device. In one embodiment, metadata 710 may include fingerprints or representatives contained within data objects 712, where a data object may represent a data segment (also referred to as a data chunk), a compression region (CR) of one or more data segments, or a container of one or more CRs. Fingerprints are mapped to a particular data object via metadata 710, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, deduplication logic 707 is present and configured to process or segment files stored in storage system 700 into multiple data segments (also referred to as data chunks, segmented chunks, or chunks) according to a variety of segmentation policies or rules. Data deduplication is a process by which a data storage system (e.g., storage system 700) can detect multiple identical copies of data and only keep a single copy of that data, thus eliminating the redundant data by removing other copies of that data and thus improving storage utilization. In at least some systems, data deduplication requires iterating over the set of data blocks in one or more storage extents, finding the blocks that contain identical information by processing digest information associated with each block and mapping the identical blocks to a single copy of the data.

In one embodiment, each file is processed by the deduplication logic 707 into multiple data segments. In one embodiment, the deduplication logic 707 breaks a file into variable-length data segments or fixed-length data segments based on a variety of rules or considerations. For example, and in one embodiment, the file is broken into multiple data segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

Figure 8:
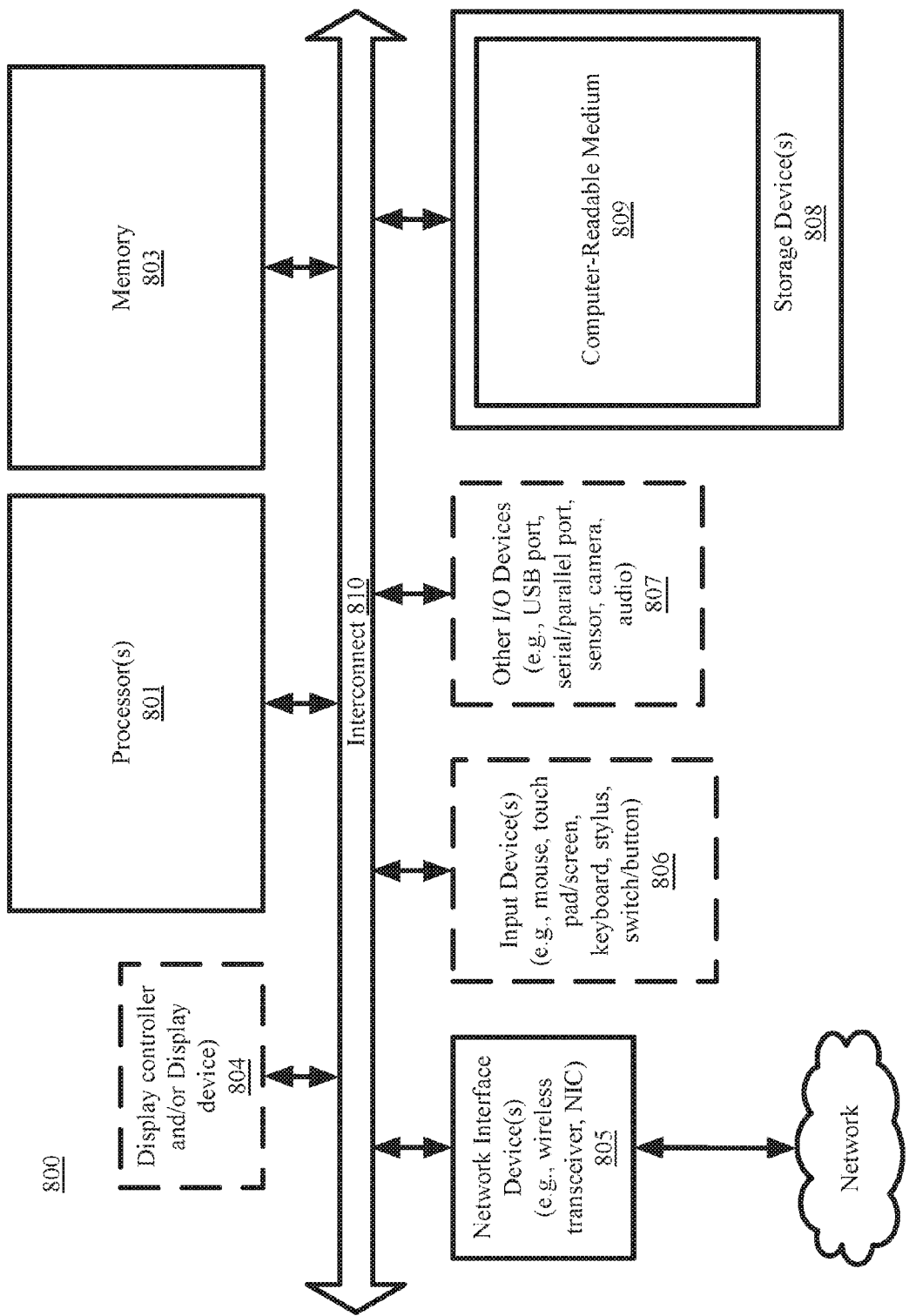
FIG. 8 is a block diagram illustrating an example of a data processing system that may be used with one embodiment.

FIG. 8 is a block diagram illustrating an example of a data processing system 800 that may be used with embodiments described herein. The data processing system 800 may represent any of the data processing systems described above and may perform any of the processes or methods described above. The data processing system 800 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 800 is intended to show a high-level view of many components of the computer system. However, it is to be understood that additional components may be present in certain implementations and furthermore, different arrangement of the components shown may occur in other implementations. The data processing system 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 800 includes one or more processor(s) 801, memory 803, and interface and storage devices 805-808 connected via a bus or an interconnect 810. The one or more processor(s) 801 may be a single processor or multiple processors with a single processor core or multiple processor cores included therein. The processor(s) 801 may represent one or more general-purpose processors such as a microprocessor, a central processing unit (CPU), or the like. More particularly, the processor(s) 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 801 may be a low power multi-core processor, such as an ultra-low voltage processor, and may act as a main processing unit and central hub for communication with the various components of the system. Such processor can be implemented as a system on chip (SoC). The processor(s) 801 are configured to execute instructions for performing the operations and steps discussed herein. The data processing system 800 may further include an optional graphics subsystem 804, which may include a display controller, a graphics processor, and/or a display device. In one embodiment at least a portion of the graphics subsystem 804 is included in the processors(s) 801.

The processor(s) 801 communicates with memory 803, which in one embodiment can be implemented via multiple memory devices to provide for a given amount of system memory. The memory 803 may include one or more volatile storage (or memory) devices such as random access memory (RAM), dynamic RAM (DRAM), synchronous DRAM (SDRAM), static RAM (SRAM), or other types of storage devices. The memory 803 may store information including sequences of instructions that are executed by the one or more processor(s) 801 or any other device. For example, executable code and/or data of a variety of operating systems, device drivers, firmware (e.g., input output basic system or BIOS), and/or applications can be loaded in the memory 803 and executed by one of the processor(s) 801. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 800 may further include IO devices such as a network interface device(s) 805, optional input device(s) 806, and other optional IO device(s) 807. The network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, the input device 806 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O devices 807 may also include an audio device. An audio device may include a speaker and/or a microphone to facilitate voice-enabled functions, such as voice recognition, voice replication, digital recording, and/or telephony functions. The other IO devices 807 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of data processing system 800.

To provide for persistent storage of information such as data, applications, one or more operating systems and so forth, a mass storage (not shown) may also couple to the processor(s) 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 801, e.g., via a serial peripheral interface (SPI). This flash device may provide for non-volatile storage of system software, including a basic input/output software (BIOS) as well as other firmware of the system.

The storage device(s) 808 may include computer-readable storage medium 809 (also known as a machine-readable storage medium) on which is stored one or more sets of instructions or software embodying any one or more of the methodologies or functions described herein. The computer-readable storage medium 809 may also be used to store the some software functionalities described above persistently. While the computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 800 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A computer-implemented method for cleaning backup images, the method comprising:
    receiving a request from a backup server connected via a network;
    in response to the request, beginning, by a backup cleaning logic executed by a processor, an input/output (I/O) recording session for I/O operations performed to a data storage system;
    sending, by the backup cleaning logic, a request to anti-malware logic to scan the data storage system to locate a data object containing malicious instructions or data associated with a malware infection;
    recording the I/O operations performed by the anti-malware logic to resolve the malware infection, including logging write IO requests to write data to a storage device of the data storage system, wherein the I/O operations replace at least a first sequence in the data object with a second sequence;
    ending the I/O recording session after recording the I/O operations performed by the anti-malware logic; and
    applying the I/O operations of the I/O recording session to resolve a malware infection in a backup image, wherein applying the IO operations comprises
        transmitting the I/O operations of the I/O recording session over the network to a remote storage server and applying the I/O operations of the I/O recording session to the backup image via the remote storage server,
        storing the I/O operations of the I/O recording session to a journal of a continuous data protection system wherein the journal of the continuous data protection system duplicates write operations to the remote storage server to a remote copy of the data storage system,
        transmitting the journal over the network to the remote storage server, and
        applying the recorder I/O operations to the backup image to resolve the malware infection in the backup image.

2. The computer-implemented method of claim 1, further comprising providing a user interface to edit the I/O recording session before applying the I/O operations of the I/O recording session.

3. The computer-implemented method of claim 1, wherein the I/O recording session records I/O operations to write to the data storage system without recording I/O operations to read from the data storage system.

4. The computer-implemented method of further comprising creating a remote journal including the I/O operations of the I/O recording session and applying the recorded I/O operations from the remote journal to the backup image to resolve the malware infection in the backup image.

5. A non-transitory machine-readable medium storing instructions which, when executed by one or more processors, cause the one or more processors to perform operations comprising:
    receiving a request from a backup server connected via a network;
    in response to the request, beginning an input/output (I/O) recording session for I/O operations performed to a data storage system;

sending a request to anti-malware logic to scan the data storage system to locate a data object containing malicious instructions or data associated with a malware infection;

recording the I/O operations performed by the anti-malware logic to resolve the malware infection, including logging write IO requests to write data to a storage device of the data storage system, wherein the I/O operations replace at least a first sequence in the data object with a second sequence;

ending the I/O recording session after recording the I/O operations performed by the anti-malware logic; and applying the I/O operations of the I/O recording session to resolve a malware infection in a backup image, wherein applying the IO operations comprises transmitting the I/O operations of the I/O recording session over the network to a remote storage server and applying the I/O operations of the I/O recording session to the backup image via the remote storage server, storing the I/O operations of the I/O recording session to a journal of a continuous data protection system wherein the journal of the continuous data protection system duplicates write operations to the remote storage server to a remote copy of the data storage system, transmitting the journal over the network to the remote storage server, and applying the recorder I/O operations to the backup image to resolve the malware infection in the backup image.

6. The non-transitory machine-readable medium of claim 5, the operations further comprising providing a user interface to edit the I/O recording session before applying the I/O operations of the I/O recording session.

7. The non-transitory machine-readable medium of claim 5, wherein the I/O recording session records I/O operations to write to the data storage system without recording I/O operations to read from the data storage system.

8. The non-transitory machine-readable medium of claim 5, further comprising creating a remote journal including the IO operations of the I/O recording session and applying the recorded I/O operations from the remote journal to the backup image to resolve the malware infection in the backup image.

9. A system comprising:
one or more server devices coupled to a data storage system, the one or more server devices configured to:
receive a request from a backup server connected via a network;
in response to the request, begin an input/output (I/O) recording session for I/O operations performed to the data storage system;
send a request to anti-malware logic executing on the one or more server devices to scan the data storage system to locate a data object containing malicious instructions or data associated with a malware infection;
record the I/O operations performed by the anti-malware logic to resolve the malware infection, including logging write IO requests to write data to a storage device of the data storage system, wherein the I/O operations replace at least a first sequence in the data object with a second sequence;
end the I/O recording session after recording the I/O operations performed by the anti-malware logic; and
apply the I/O operations of the I/O recording session to resolve a malware infection in a backup image, including
transmit the I/O operations of the I/O recording session over the network to a remote storage server and apply the I/O operations of the I/O recording session to the backup image via the remote storage server,
store the I/O operations of the I/O recording session to a journal of a continuous data protection system wherein the journal of the continuous data protection system duplicates write operations to the remote storage server to a remote copy of the data storage system,
transmit the journal over the network to the remote storage server, and
apply the recorded I/O operations to the backup image to resolve the malware infection in the backup image.

10. The system of claim 9, wherein the one or more server devices are further configured to provide a user interface to edit the I/O recording session before applying the I/O operations of the I/O recording session.

11. The system of claim 9, wherein the I/O recording session records I/O operations to write to the data storage system without recording I/O operations to read from the data storage system.

12. The system of claim 9, wherein one or more server devices are further configured to create a remote journal including the I/O operations of the I/O recording session and apply the recorded I/O operations from the remote journal to the backup image to resolve the malware infection in the backup image.

* * * * *